United States Patent [19]

Yamagata

[11] Patent Number: 4,539,459

[45] Date of Patent: Sep. 3, 1985

[54] NOZZLE AND POWER-FEED ELEMENT FOR WIRE-CUT ELECTRICAL DISCHARGE MACHINE

[75] Inventor: Toshitaka Yamagata, Tokyo, Japan

[73] Assignee: Amada Company, Limited, Japan

[21] Appl. No.: 495,616

[22] Filed: May 18, 1983

[30] Foreign Application Priority Data

May 19, 1982 [JP] Japan .................................. 57-83257
May 19, 1982 [JP] Japan .............................. 57-71916[U]

[51] Int. Cl.³ .......................... B23P 1/08; B23P 1/16
[52] U.S. Cl. ................................ 219/69 W; 219/69 D
[58] Field of Search ............... 219/69 W, 69 M, 69 E, 219/69 R, 69 D

[56] References Cited

U.S. PATENT DOCUMENTS

| 4,052,583 | 10/1977 | Inoue | 219/69 W |
| 4,205,212 | 5/1980 | Ullmann et al. | 219/69 W |

FOREIGN PATENT DOCUMENTS

| 0137329 | 5/1976 | Japan | 219/69 W |

*Primary Examiner*—M. H. Paschall
*Attorney, Agent, or Firm*—Wigman & Cohen

[57] ABSTRACT

A wire-cut electrical discharge machine which effects an electrical discharges between a wire electrode and the workpiece. The wire-cut machine has a supply nozzle for supplying a machining fluid to an electrical discharge machining zone and a power-feed element for supplying pulse power to the wire electrode. The power-feed element contacting the wire electrode is provided inside the supply nozzle.

6 Claims, 4 Drawing Figures

NOZZLE AND POWER-FEED ELEMENT FOR WIRE-CUT ELECTRICAL DISCHARGE MACHINE

BACKGROUND OF THE INVENTION

1. Field of the Invention

The present invention relates to a wire-cut electrical discharge machine and more particularly to a wire-cut electrical discharge machine having a nozzle means or supply nozzle permitting improvement in the efficiency of feeding a current to a wire electrode and the efficiency of removing machining chips from the electrical discharge machining zone in a workpiece.

2. Description of the Prior Art

In general, wire-cut electrical discharge machines comprise: a table which is adapted to be movable in the directions of X and Y axes; for supporting a workpiece, a wire supply unit for continuously supplying a thin wire electrode to an electrical discharge machining zone; and a wire take-up unit for continuously taking up the wire electrode. The wire-cut electrical discharge machines carry out an electrical discharge machining of a workpiece while slightly moving the same along X and Y axes. More specifically, a minute gap is formed between the workpiece and the wire electrode supplied from the wire supply unit to the electrical discharge machining zone, and the wire electrode is fed with a current in the form of pulses, thereby causing electrical discharges which continuously take place between the wire electrode and the workpiece.

For increasing the removal rate in the wire-cut electrical discharge machines of this type, it is necessary to make a power-feed portion for feeding electrical pulses to the wire electrode as close to the electrical discharge machining zone as possible in order to efficiently feed the electrical pulses to the electrical discharge machining zone. In addition, it is necessary to cool the power-feed portion as much as possible in order to prevent the wire electrode from being burdened. Moreover, it is required to reliably remove minute machining chips and other products resulting from an electrical discharge machining from the electrical discharge machining zone in order to maintain the condition about the electrical discharge machining zone in an excellent state under predetermined conditions.

In the wire-cut electrical discharge machines, however, in order to effect a highly accurate machining by the use of a thin wire electrode, the wire electrode which is continuously moved must be highly accurately guided and held at a precise position. Consequently, in the conventional wire-cut electrical discharge machines, the wire electrode guiding/holding portion is located close to the electrical discharge machining zone, while the power-feed portion for feeding electrical pulses to the wire electrode is disadvantageously largely separate from the electrical discharge machining zone, resulting in a low power feed efficiency. Moreover, when the guiding/holding portion is close to the electrical discharge machining zone, the efficiency of supply of a machining fluid to the electrical discharge machining zone is unfavorably deteriorated.

SUMMARY OF THE INVENTION

Accordingly, a first object of the invention is to provide a wire-cut electrical discharge machine in which the power-feed portion for feeding a series of electrical pulses to the wire electrode is disposed as close to the electrical discharge machining zone as possible for increasing the electrical discharge machining speed.

A second object of the invention is to provide a wire-cut electrical discharge machine improved to permit the power-feed portion to be effectively cooled by means of a machining fluid as well as to allow a high-pressure machining fluid to be supplied to the electrical discharge machining zone thereby to reliably remove machining chips from the electrical discharge machining zone without adversely affecting the wire electrode.

A third object of the invention is to provide a wire-cut electrical discharge machine capable of easily and speedily coping with the wear of the power-feed portion.

To these ends, according to one aspect of the invention, the power-feed portion is provided in a supply nozzle for jetting out a machining fluid toward the electrical discharge machining zone, and the contact position of the current power-feed portion with the wire electrode is made variable. Moreover, according to another aspect of the invention, a nozzle having a nozzle port for jetting out a machining fluid is provided so as to be vertically movable by means of the pressure of the machining fluid, and the nozzle port is adapted to be able to come in contact with or close to the workpiece.

Other and further objects and advantages of the present invention will be apparent from the following description and accompanying drawings which, by way of illustration, show a preferred embodiment of the present invention and the principle thereof.

DESCRIPTION OF THE PREFERRED EMBODIMENT

Figure 1:
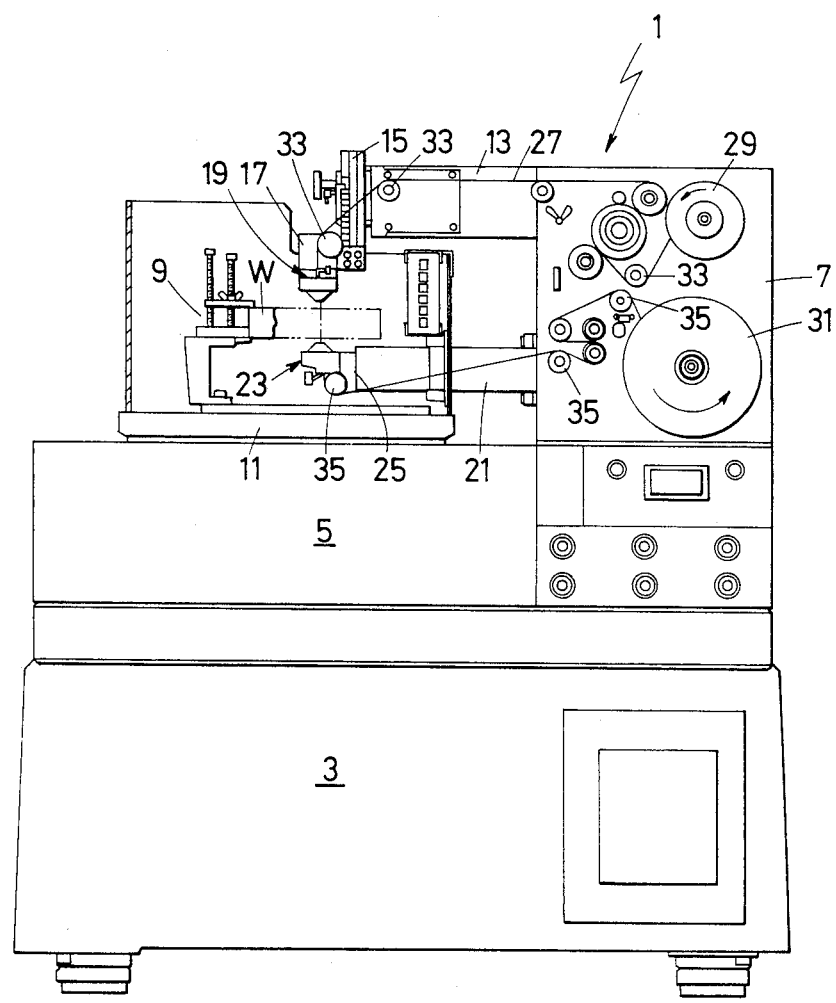
FIG. 1 is front elevational view of a wire-cut electrical discharge machine according to the invention.

Referring to FIG. 1, a wire-cut electrical discharge machine 1 has a machining fluid reservoir 5 and a column unit 7 which are provided on a box-shaped base 3. Above the machining fluid reservoir 5, a movable table 11 is supported movably in the directions of X and Y axes which is provided with a work clamp 9 for fixing and supporting a workpiece W. On the upper side surface of the column unit 7, an upper arm 13 is mounted horizontally extending above the workpiece W. A vertical slider 15 is vertically adjustably attached to the distal end portion of the upper arm 13. An upper nozzle holder 17 is attached to the lower end portion of the vertical slide 15 and is fitted with an upper machining fluid supply nozzle 19. In addition, a lower arm 21 parallel to the upper arm 13 is mounted on the side surface of the column unit 7 near the lower part thereof. The distal end portion of the lower arm 21 is located below the workpiece W and is fitted, through a lower nozzle holder 25, with a lower machining fluid supply nozzle 23 facing the upper machining fluid supply nozzle 19. The upper and lower machining fluid supply nozzles 19 and 23 are adapted to supply jets of a machining fluid such as distilled water toward an electrical discharge machining zone in the workpiece W as well as to guide and hold a wire electrode 27.

A supply reel 29 is rotatably attached to the upper part of the column unit 7 for continuously supplying the thin wire electrode 27 to the electrical discharge machining zone. A take-up reel 31 is rotatably provided below the supply reel 29. The wire electrode 27 supplied from the supply reel 29 passes through a plurality of rotatable upper guide reels 33 provided between the supply reel 29 on the column unit 7 and the upper nozzle holder 17 and reaches the upper machining fluid supply nozzle 19, from which the wire electrode 27 passes through the electrical discharge machining zone in the workpiece W and reaches the lower machining fluid supply nozzle 23. Moreover, the wire electrode 27 passes through a plurality of rotatable lower guide reels 35 provided between the take-up reel 31 on the column unit 7 and the lower nozzle holder 25 and is then wound up on the take-up reel 31.

In the wire-cut electrical discharge machine having the above construction, the movement of the movable table 11 in the directions of X and Y axes, the continuous supply of the wire electrode 27 to the electrical discharge machining zone in the workpiece W, the feeding of electrical pulses to the wire electrode 27 and so forth are controlled by means of a proper controller such as numerical controller in the same manner as that in the conventional wire-cut electrical discharge machines.

The construction of each of the upper and lower machining fluid supply nozzles 19 and 23 will be described hereinunder in detail.

Figure 2:
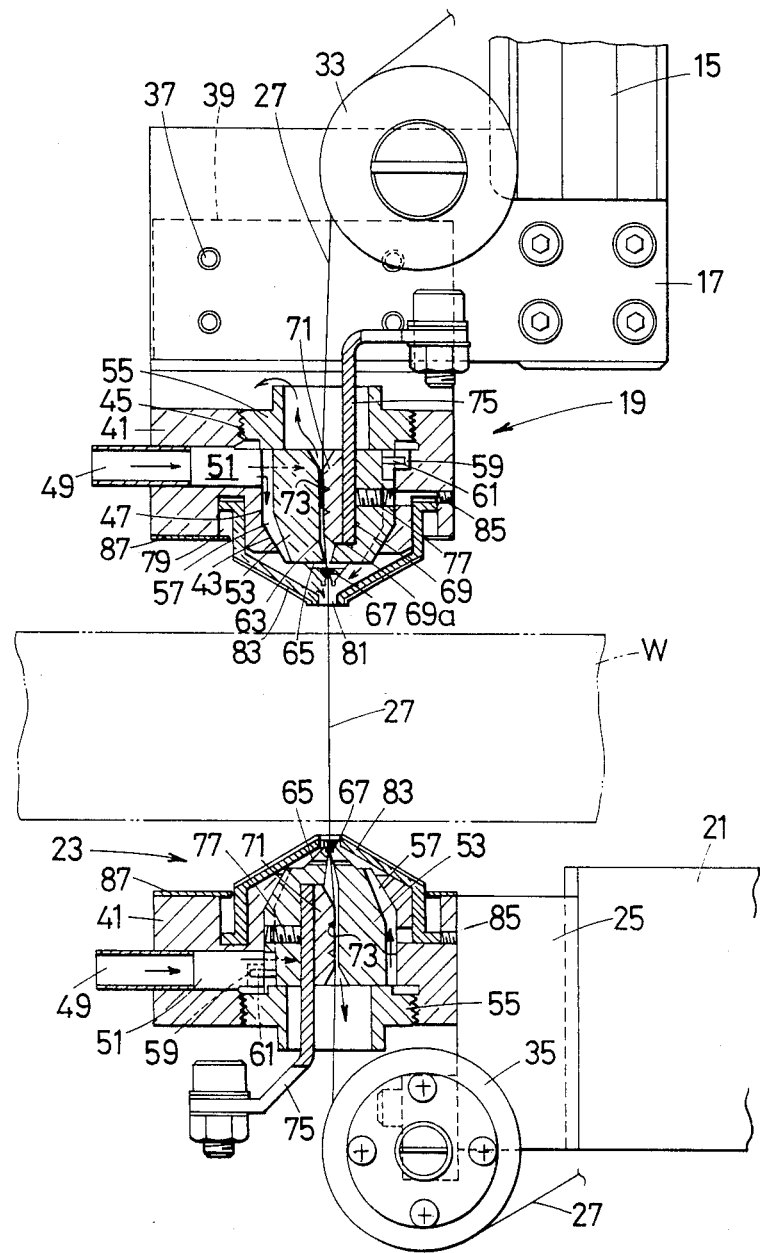
FIG. 2 is a front cross-sectional view of upper and lower machining fluid supply nozzle units in the wire-cut electrical discharge machine shown in FIG. 1.

Referring now to FIG. 2, a support plate 39 is suspended from the upper nozzle holder 17 by means of a plurality of bolts 37. The upper machining fluid supply nozzle 19 is integrally attached to the support plate 39. In the central part of a holder block 41 in the upper machining fluid supply nozzle 19, a holder bore 47 is formed having in the lower part thereof a tapered bore portion 43 converging toward its lower side and a tapped bore 45 in the upper part thereof. The holder bore 47 is allowed to communicate with a machining fluid supply bore 51 connected with a supply pipe 49. The holder bore 47 receives a power-feed element holder 53 having its lower part tapered. The power-feed element holder 53 is pressed and fixed by means of an annular holder-fixing nut member 55 screwed in the tapped bore 45.

The power-feed element holder 53 has a cylindrical shape with a tapered lower part, and the lower end portion thereof is downwardly projected from the holder bore 47. The power-feed element holder 53 has on its outer peripheral surface a plurality of grooves 57 for downwardly guiding the machining fluid supplied from the machining fluid supply bore 51 to the holder bore 47. Moreover, the power-feed element holder 53 has at a proper position on its outer peripheral surface a horizontally projecting pin 61 engaging a keyway 59 formed in the inner peripheral surface of the holder bore 47. Accordingly, the positional relationship between the holder block 41 and the power-feed element holder 53 is maintained constant at all times.

A passable bore 63 through which the wire electrode 27 is able to pass freely is formed vertically through the axial part of the power-feed element holder 53. The lower part of the passable bore 63 is allowed to communicate with radial communication bores 65 formed in the lower part of the power-feed element holder 53 and is provided with a wire guide 67 for guiding and holding the wire electrode 27. The wire guide 67 is made of a hard member, e.g., diamond or sapphire. The passable bore 63 of the power-feed element holder 53 is formed with a recess 69 having a step portion 69a. The recess 69 houses a power-feed element 71 to be contacted by the wire electrode 27. V-shaped grooves 73 extending in the direction perpendicular to the axis of the wire electrode 27 are formed in the contact surface of the power-feed element 71 with the wire electrode 27 in order to allow the wire electrode 27 and the power-feed element 71 to contact each other at a plurality of portions to raise the power-feed efficiency. The power-feed element 71 is integrally fixed to the lower end portion of a terminal 75. The upper part of the terminal 75 passes through in the holder-fixing nut member 55 and bent in a proper direction. Therefore, the terminal 75 and the power-feed element 71 are integrally detachable from the recess 69 in the power-feed element holder 53. The terminal 75 and the power-feed element 71 are adjustable in position by means of an adjusting screw 77 screwed in the power-feed element holder 53.

An annular groove 79 is formed in the lower surface of the holder block 41 and is fitted with the base portion of a conical nozzle 83 having in its central part a nozzle port 81 for jetting out the machining fluid toward the workpiece W. The nozzle 83 has a flange portion formed at its base portion and is fixed so as to be slightly adjustable in the vertical direction by means of a set screw 85 screwed to the holder block 41. Moreover, the nozzle 83 is prevented from coming out from the groove 79 by means of a coming-out preventing plate 87 secured to the holder block 41.

In such a construction as described above, the machining fluid supplied from the machining fluid supply bore 51 to the holder bore 47 passes through the groove 57 in the power-feed element holder 53 and reaches the inside of the nozzle 83 and is then jetted out from the nozzle port 81 toward the electrical discharge machining zone in the workpiece W while surrounding the wire electrode 27. Accordingly, the electrical discharge machining zone in the workpiece W is cooled and moreover, the machining chips are flushed away from the electrical discharge machining zone, thereby allowing the electrical discharge machining zone to be maintained in condition under predetermined conditions. In addition, a part of the machining fluid in the nozzle 83 flows into the passable bore 63 from the communication bores 65 in the power-feed element holder 53 and rises while cooling the power-feed element 71 and the wire electrode 27 and then overflows from the nut member 55. Accordingly, the power-feed portion is cooled so that the wire electrode 27 will not be burdened. Moreover, the power-feed element 71 is provided inside the supply nozzle 19 and supplies electrical pulses to the wire electrode 27 at a position close to the wire guide 67. As a result, the power-feed element 71 supplies the electrical pulses to the wire electrode 27 at a position close to the electrical discharge machining zone in the workpiece W, thereby permitting an efficient power feed.

Since the lower machining fluid supply nozzle 23 has substantially the same construction as that of the upper machining fluid supply nozzle 19 although it is vertically inverted, the constituent members of the lower machining fluid supply nozzle 23 having the same functions as those of the upper machining fluid supply nozzle 19 are denoted by the same reference numerals, and the detailed description thereof is omitted.

Figure 3:
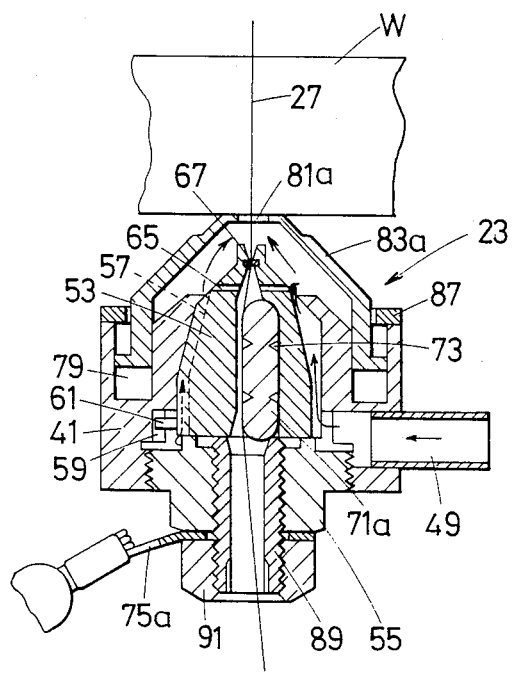
FIG. 3 is a front cross-sectional view of a second example of the lower machining fluid supply nozzle.

FIG. 3 shows a second example of the lower machining fluid supply nozzle 23. This example can be employed as the upper machining fluid supply nozzle. In the example shown in FIG. 3, a power-feed element 71a is formed so that its obverse and reverse sides are symmetrical with each other, and a power-feed element holder 89 constituted by a tubular screw is screwed in the holder-fixing nut member 55 so as to fix the power-feed element 71a. In addition, a terminal 75a is fixed to the power-feed element holder 89 by means of a nut 91. Moreover, a nozzle 83a is provided so as to be vertically movable by means of the pressure of the machining fluid in the nozzle 83a, and a nozzle port 81a of the nozzle 83a is adapted to be able to freely contact the workpiece W. It is to be noted that since the construction of the other constituent members is the same as that of the first example shown in FIG. 2, the members having the same functions in the two examples are denoted by the same reference numerals, and the detailed description thereof is omitted.

According to the construction of the second example, when the obverse side of the power-feed element 71a has been worn away by the contact with the wire electrode 27 using over a long period of time, the power-feed element 71a is demounted and inverted and then remounted, thereby allowing the reverse side thereof to be used and making it possible to speedily cope with the wear of the power-feed element 71a. Moreover, since the nozzle 83a is able to vertically move to contact the workpiece W, there is a reduction in amount of the machining fluid scattering from the gap between the workpiece W and the nozzle 83a. Consequently, there is no loss in supply of the machining fluid to the electrical discharge machining zone in the workpiece W, and the removal of the machining chips from the electrical discharge machining zone is further improved.

Figure 4:
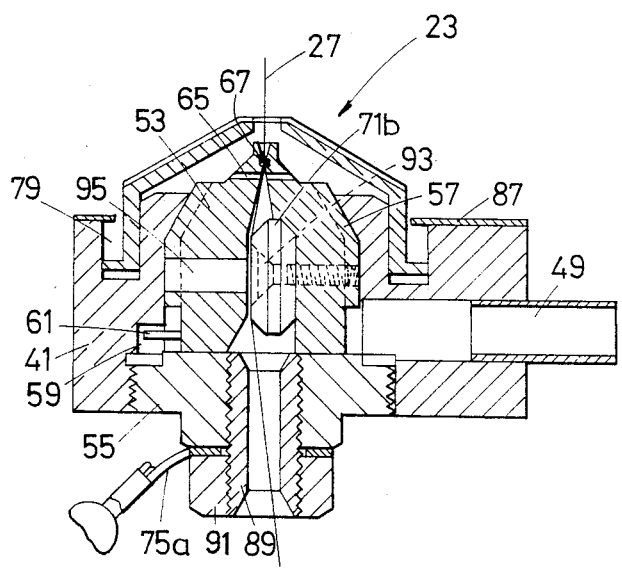
FIG. 4 is a front cross-sectional view of a third example of the lower machining fluid supply nozzle.

In a third example of the lower machining fluid supply nozzle 23 shown in FIG. 4, a power-feed element 71b is formed into a disc shape having obverse and reverse sides symmetrical with each other and is fixed so as to be adjustable in rotational position by means of a bolt 93, which is operated by inserting a tool into a bore 95 formed in the power-feed element holder 53. Since the construction of the other constituent members is the same as that of the second example shown in FIG. 3, the members in the third example having the same functions as those in the second example are denoted by the same reference numerals, and the detailed description thereof is omitted.

In the third example, the disc-shaped power-feed element 71b is adapted to be able to use its obverse and reverse sides by changing one for the other as well as to be usable by properly rotating and fixing the same. Accordingly, every time a portion of the power-feed element 71b is worn away by the contact with the wire electrode 27, the power-feed element 71b is properly rotated. Thereby, it is possible to cope with the wear speedily and over a long period of time.

As will be fully understood from the foregoing description of the embodiment, according to the invention, the power-feed element for feeding electrical pulses to the wire electrode is provided inside a machining fluid supply nozzle. Therefore, the power-feed element portion is cooled by means of a machining fluid as well as is close to the workpiece, so that a current is efficiently fed to the wire electrode. In addition, since the nozzle is vertically movable by means of the pressure of the machining fluid and is able to freely contact the workpiece, there is a reduction in amount of the machining fluid flowing out from the gap between the workpiece and the nozzle. Accordingly, it is possible to supply the machining fluid to the electrical discharge machining zone in the workpiece with little loss, and the machining chips are reliably removed from the electrical discharge machining zone. Moreover, the power-feed element is able to change its contact position with the wire electrode, so that it is possible to speedily cope with the wear of the power-feed element.

Although a preferred form of the present invention has been illustrated and described, it should be understood that the device is capable of modification by one skilled in the art without departing from the principles of the invention. Accordingly, the scope of the invention is to be limited only by the claim appended hereto.

What is claimed is:

1. A wire-cut electrical discharge machine which effects an electrical discharge machining of a workpiece by generating electrical discharges between a wire electrode continuously supplied from a wire supply unit and said workpiece, comprising:

a nozzle means for supplying a machining fluid to an electrical discharge machining zone, said nozzle means being provided on the upper and/or lower sides of said workpiece;

a power-feed element contacting said wire electrode in order to feed a current thereto, said power-feed element being provided inside said nozzle means; and a nozzle having a nozzle port for jetting out said machining fluid toward the electrical discharge machining zone, said nozzle being adapted to be vertically movable with respect to the power-feed element by means of the pressure of said machining fluid.

2. A wire-cut electrical discharge machine defined in claim 1, wherein said power-feed element provided inside said nozzle means is adapted to be detachable from said nozzle means and the power-feed element has obverse and reverse sides that are symmetrical with each other.

3. A wire-cut electrical discharge machine defined in claim 1, wherein said power-feed element has a disc shape.

4. A wire-cut electrical discharge machine defined in claim 1, wherein said power-feed element and said wire electrode contact each other at a plurality of portions.

5. A wire-cut electrical discharge machine defined in claim 4, wherein contact surface of said power-feed element with said wire electrode are divided in plural portions by a convex formed on said contact surface.

6. A wire-cut electrical discharge machine which effects an electrical discharge machining of a workpiece by generating electrical discharges between a wire electrode continuously supplied from a wire supply unit and said workpiece, comprising:

a nozzle means for supplying a machining fluid to an electrical discharge machining zone, said nozzle means being provided on the upper and/or lower sides of said workpiece;

a power feed element holder mounted within said nozzle means;

a power-feed element adjustably mounted in said holder, said element contacting said wire electrode in order to feed a current thereto, said power-feed element being provided inside said nozzle means;

an annular groove in said nozzle means;

a nozzle port for jetting out machining fluid toward the electrical discharge machining zone, said nozzle port having a flange that fits within said annular groove; and a locking means for fixing the relative position of said nozzle port with respect to the nozzle means and the power-feed element, whereby when said locking means is unlocked, the nozzle port can be vertically moved with respect to the power-feed element by the pressure of said machining fluid.

* * * * *